(12) United States Patent
Thubert et al.

(10) Patent No.: US 9,859,970 B2
(45) Date of Patent: Jan. 2, 2018

(54) PARENT DEVICE ALLOCATION OF RETRANSMIT SLOT TO CHILD NETWORK DEVICE ON BEHALF OF PEER CHILD DEVICE IN A DETERMINISTIC NETWORK

(71) Applicant: Cisco Technology, Inc., San Jose, CA (US)

(72) Inventors: Pascal Thubert, La Colle sur Loup (FR); Jean-Philippe Vasseur, Saint Maritn d'Uriage (FR); Eric Michel Levy-Abegnoli, Valbonne (FR); Patrick Wetterwald, Mouans Sartoux (FR)

(73) Assignee: Cisco Technology, Inc., San Jose, CA (US)

(*) Notice: Subject to any disclaimer, the term of this patent is extended or adjusted under 35 U.S.C. 154(b) by 142 days.

(21) Appl. No.: 14/642,066

(22) Filed: Mar. 9, 2015

(65) Prior Publication Data
US 2016/0269096 A1    Sep. 15, 2016

(51) Int. Cl.
| | | |
|---|---|---|
| *H04B 7/155* | (2006.01) | |
| *H04W 72/04* | (2009.01) | |
| *H04W 84/18* | (2009.01) | |
| *H04L 1/00* | (2006.01) | |
| *H04W 84/20* | (2009.01) | |

(52) U.S. Cl.
CPC ........... *H04B 7/15507* (2013.01); *H04L 1/00* (2013.01); *H04W 72/0446* (2013.01); *H04W 84/18* (2013.01); *H04W 84/20* (2013.01)

(58) Field of Classification Search
CPC ................ H04W 72/0406; H04W 72/0446
See application file for complete search history.

(56) References Cited

U.S. PATENT DOCUMENTS

| | | | |
|---|---|---|---|
| 7,133,396 B1* | 11/2006 | Schmidl | ................ H04L 1/0001 370/337 |
| 7,366,111 B2 | 4/2008 | Thubert et al. | |

(Continued)

OTHER PUBLICATIONS

Marchenko et al., "An Experimental Study of Selective Cooperative Relaying in Industrial Wireless Sensor Networks", IEEE Transactions on Industrial Informatics, vol. 10, No. 3, p. 1806-16; Aug. 2014.*

(Continued)

*Primary Examiner* — Asad Nawaz
*Assistant Examiner* — Saad A Waqas
(74) *Attorney, Agent, or Firm* — Leon R. Turkevich

(57) ABSTRACT

In one embodiment, a method comprises receiving, by a parent network device in a wireless deterministic network, a retransmit capabilities message from a first child device attached to the parent network device, the retransmit capabilities message specifying that the first child device can detect a data packet transmission to the parent network device by a second child device attached to the parent network device and that is a peer of the first child device; and allocating, by the parent network device, a peer retransmit timeslot to the first child device from within a channel distribution chunk appropriated by the parent network device, the peer retransmit timeslot enabling the first child device to retransmit a data packet on behalf of the second child device to the parent network device.

20 Claims, 4 Drawing Sheets

(56) References Cited

U.S. PATENT DOCUMENTS

| | | | | |
|---|---|---|---|---|
| 7,760,109 | B2* | 7/2010 | Broad | G08B 25/009 340/286.02 |
| 8,111,684 | B2 | 2/2012 | Thubert et al. | |
| 2005/0208945 | A1* | 9/2005 | Hong | H04W 36/0055 455/436 |
| 2010/0254369 | A1* | 10/2010 | Tao | H04L 1/1621 370/346 |
| 2013/0322321 | A1* | 12/2013 | Zhang | H04L 1/0076 370/315 |
| 2014/0006893 | A1 | 1/2014 | Shetty et al. | |
| 2014/0233375 | A1 | 8/2014 | Thubert et al. | |

OTHER PUBLICATIONS

Girs et al., "On the Role of Feedback for Industrial Wireless Networks Using Relaying and Packet Aggregation", 2014 IEEE International Conference on Industrial Technology (ICIT), IEEE, Feb. 26-Mar. 1, 2014, Busan, Korea, XP032639895, pp. 743-748.

Berger et al., "Energy Efficient and Reliable Wireless Sensor Networks—An Extension to IEEE 802.15.4e", EURASIP Journal on Wireless Communications and Networking, vol. 2014, No. 1, Jun. 6, 2014, XP055268283, pp. 1-11.

"Amendment 5: Physical Layer Specifications for Low Energy, Critical Infrastructure Monitoring Networks", IEEE Draft Standard for Local and metropolitan area networks—Part 15.4: Low-Rate Wireless Personal Area Networks (WPANs), Piscataway, NJ, vol. P802.15.4k/D5, Apr. 25, 2013, XP068051606, pp. 1-152.

Vilajosana, Ed., et al., "Minimal 6TiSCH Configuration", [online], Mar. 8, 2015, [retrieved on Jul. 13, 2015]. Retrieved from the Internet: <URL: https://tools.ietf.org/pdf/draft-ietf-6tisch-minimal-06.pdf>, pp. 1-21.

Watteyne, Ed., et al., "Using IEEE802.15.4e TSCH in an IoT context: Overview, Problem Statement and Goals", [online], Jan. 8, 2015, [retrieved on Jul. 13, 2015]. Retrieved from the Internet: <URL: https://tools.ietf.org/pdf/draft-ietf-6tisch-tsch-05.pdf>, pp. 1-22.

Hart Communication Foundation, "Wireless Introduction", [online], [retrieved on Jan. 29, 2013]. Retrieved from the Internet: <URL: http://www.hcf-files.com/webasyst/published/DD/html/scripts/getfolderfile_zoho.php?DL_ID=MTA5NQ%3D%3D &ID=72a7beb0a6eeba6aaf06ef19e00ce258&DB_ KEY=V0VCRkIMRVM%3D>, pp. 1-11.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert, Ed., et al., "An Architecture for IPv6 over the TSCH mode of IEEE 802.15.43", [online], Jan. 27, 2015, [retrieved on Feb. 18, 2015]. Retrieved from the Internet: <URL: http://tools.ietf.org/pdf/draft-ietf-6tisch-architecture-05.pdf>, pp. 1-40.

Palattella, Ed., et al., "Terminology in IPv6 over the TSCH mode of ISSS 802.15.4e", [online], Jan. 8, 2015, [retrieved on Feb. 18, 2015]. Retrieved from the Internet: <URL: http://tools.ietf.org/pdf/draft-ietf-6tisch-terminology-03.pdf>, pp. 1-14.

Wikipedia, "ISM band", [online], Feb. 24, 2015, [retrieved on Feb. 25, 2015]. Retrieved from the Internet: <URL: http://en.wikipedia.org/w/index.php?title=ISM_band&printable=yes>, pp. 1-5.

Winter, Ed., et al., "RPL: IPv6 Routing Protocol for Low-Power and Lossy Networks", Internet Engineering Task Force (IETF), Request for Comments: 6550, Mar. 2012, pp. 1-157.

ISA100 Wireless Compliance Institute, "ISA100 Wireless Applications, Technology, and Systems—A Tutorial White Paper", Nov. 10, 2014, pp. 1-31.

Thubert et al., U.S. Appl. No. 14/366,005, filed Jul. 21, 2014.

Thubert et al., U.S. Appl. No. 14/629,884, filed Feb. 24, 2015.

Diggavi et al., "Great Expectations: The Value of Spatial Diversity in Wireless Networks," [online] Proceedings of the IEEE, vol. 92, No. 2, 2004 [retrieved on Jan. 6, 2017]. Retrieved from the Internet: <URL: http://citeseerx.ist.psu.edu/viewdoc/download;Jsessionid= 520C2911E10F038D7EE9C438C10041E0?doi=10.1.1.101.4668 &rep=rep1&type=pdf>, pp. 219-270 (52 pages).

* cited by examiner

PARENT DEVICE ALLOCATION OF RETRANSMIT SLOT TO CHILD NETWORK DEVICE ON BEHALF OF PEER CHILD DEVICE IN A DETERMINISTIC NETWORK

TECHNICAL FIELD

The present disclosure generally relates to a parent network device allocating a retransmit slot to a child network device on behalf of a peer child device in a deterministic network, for example an IPv6 Time Slotted Channel Hopping (6TiSCH) based network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. Routes can be based on the routing protocol for LLNs (RPL).

The 6TiSCH architecture specifies a Channel distribution/usage (CDU) matrix of "cells", each cell representing a unique wireless channel at a unique timeslot. The CDU is partitioned into prescribed "chunks", each chunk comprising multiple cells distributed in time and frequency (i.e., a different channel each timeslot). The 6TiSCH architecture specifies that a RPL parent device can allocate cells within an appropriated chunk to its first-hop child devices within its interference domain.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
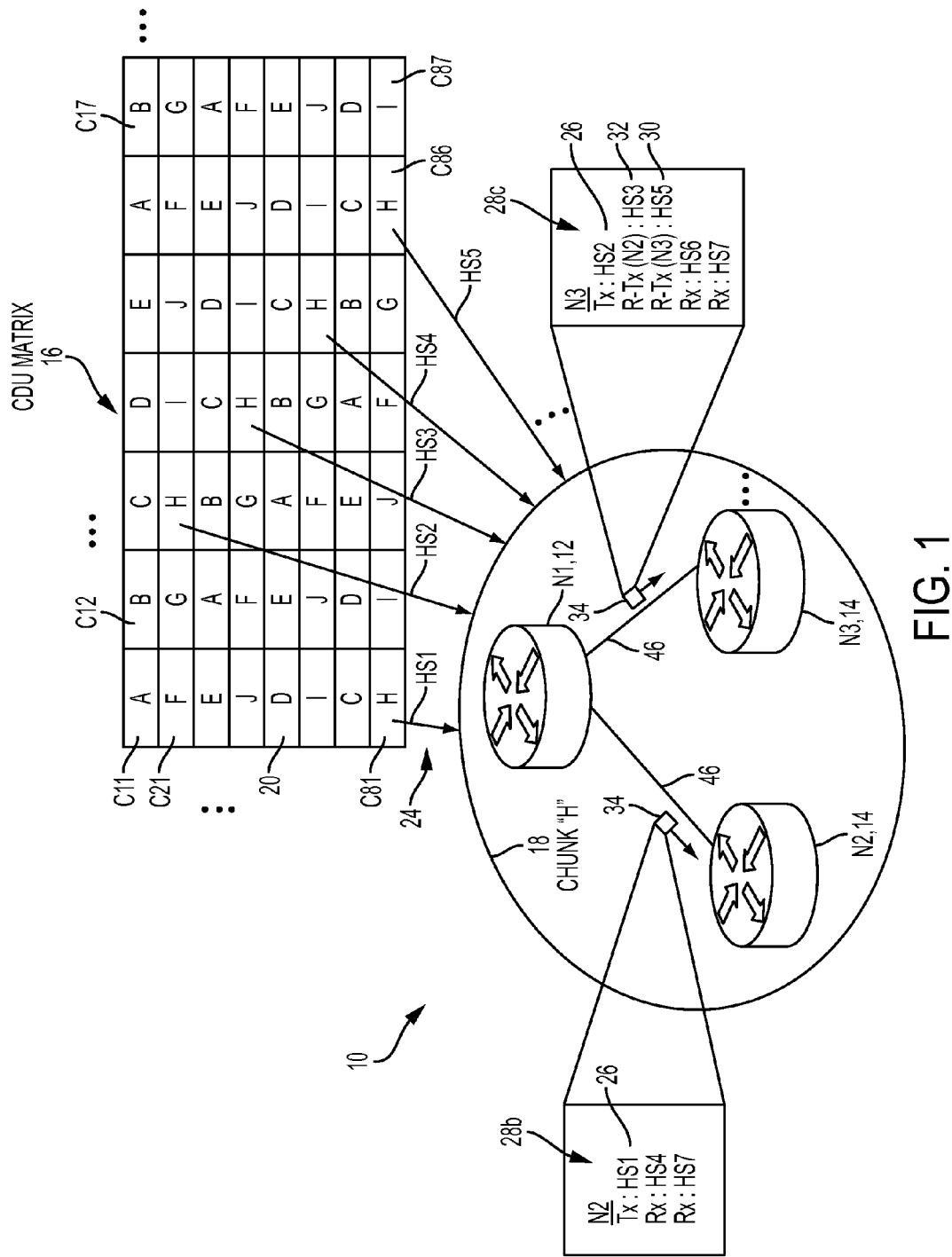
FIG. 1 illustrates an example deterministic network having a parent network device for allocating one or more retransmit timeslots to a child network device for retransmission on behalf of a transmitting device, for example a peer child device or the parent network device, according to an example embodiment.

In one embodiment, a method comprises receiving, by a parent network device in a wireless deterministic network, a retransmit capabilities message from a first child device attached to the parent network device, the retransmit capabilities message specifying that the first child device can detect a data packet transmission to the parent network device by a second child device attached to the parent network device and that is a peer of the first child device; and allocating, by the parent network device, a peer retransmit timeslot to the first child device from within a channel distribution chunk appropriated by the parent network device, the peer retransmit timeslot enabling the first child device to retransmit a data packet on behalf of the second child device to the parent network device.

In another embodiment, an apparatus comprises a device interface circuit and a processor circuit. The device interface circuit is configured for receiving, in a wireless deterministic network, a retransmit capabilities message from a first child device attached to the apparatus, the retransmit capabilities message specifying that the first child device can detect a data packet transmission to the apparatus by a second child device attached to the apparatus and that is a peer of the first child device. The processor circuit is configured for allocating a peer retransmit timeslot to the first child device from within a channel distribution chunk appropriated by the apparatus. The peer retransmit timeslot enables the first child device to retransmit a data packet on behalf of the second child device to the apparatus.

In another embodiment, one or more non-transitory tangible media are encoded with logic for execution by a machine and when executed by the machine operable for: receiving, by a parent network device in a wireless deterministic network, a retransmit capabilities message from a first child device attached to the parent network device, the retransmit capabilities message specifying that the first child device can detect a data packet transmission to the parent network device by a second child device attached to the parent network device and that is a peer of the first child device; and allocating, by the parent network device, a peer retransmit timeslot to the first child device from within a channel distribution chunk appropriated by the parent network device, the peer retransmit timeslot enabling the first child device to retransmit a data packet on behalf of the second child device to the parent network device.

In yet another embodiment, a method comprises sending, by a child network device attached to a parent network device in a wireless deterministic network, a retransmit capabilities message to the parent network device, the retransmit capabilities message specifying that the child network device can detect a data packet transmission to the parent network device by a second child device attached to the parent network device and that is a peer of the child network device; and receiving, by the child network device from the parent network device, a peer retransmit timeslot allocated to the child network device from within a channel distribution chunk appropriated by the parent network device, the peer retransmit timeslot enabling the child device to retransmit a data packet on behalf of the second child device to the parent network device.

In another embodiment, an apparatus comprises a processor circuit and a device interface circuit. The processor circuit is configured for generating a retransmit capabilities message for a parent network device in a wireless deterministic network, the apparatus attached as a child network device to the parent network device. The retransmit capabilities message specifies that the apparatus can detect a data packet transmission to the parent network device by a second child device attached to the parent network device and that is a peer of the apparatus. The device interface circuit is configured for sending the retransmit capabilities message to the parent network device. The device interface circuit further is configured for receiving, from the parent network device, a peer retransmit timeslot allocated to the apparatus from within a channel distribution chunk appropriated by the parent network device. The peer retransmit timeslot enables the apparatus to retransmit a data packet on behalf of the second child device to the parent network device.

In another embodiment, one or more non-transitory tangible media are encoded with logic for execution by a machine and when executed by the machine operable for: sending, by a child network device attached to a parent network device in a wireless deterministic network, a retransmit capabilities message to the parent network device, the retransmit capabilities message specifying that the child network device can detect a data packet transmission to the parent network device by a second child device attached to the parent network device and that is a peer of the child network device; and receiving, by the child network device from the parent network device, a peer retransmit timeslot allocated to the child network device from within a channel distribution chunk appropriated by the parent network device, the peer retransmit timeslot enabling the child device to retransmit a data packet on behalf of the second child device to the parent network device.

DETAILED DESCRIPTION

Particular embodiments provide a scalable improvement in packet delivery rates in deterministic data networks, based on introducing spatial diversity using one or more child network devices (i.e., "child devices") that promiscuously detect data packet communications between a peer child device and a parent network device. The parent network device in a tree-based network (e.g. a RPL network) can allocate one or more retransmit timeslots to one or more child network devices attached to the parent network device that can be used to retransmit data packets on behalf of other network devices. The one or more retransmit timeslots can be allocated by the parent network device from within a channel distribution chunk appropriated by the parent network device within the tree-based network.

In response to the one or more child nodes determining an absence of an acknowledgement for a promiscuously-detected data packet during an identifiable timeslot of the channel distribution chunk, a child node can retransmit the data packet, on behalf of the source of the data packet, during the retransmit timeslot allocated by the parent network device. If the first retransmission of the data packet is not acknowledged, a second child node can retransmit the data packet during the corresponding retransmit timeslot allocated to the second child node. The original "source" of the data packet can be a "failing" transmitting child network device sending the data packet to the parent network device and failing to receive an acknowledgement; the original "source" of the data packet also can be the parent network device sending the data packet to a "failing" receiving child network device that fails to send an acknowledgement.

Hence, the example embodiments enable one or more of the child network devices directly attached to the parent network device to form a "band of brothers" that can retransmit a data packet using an allocated retransmit timeslot on behalf of a "failing" transmitting child network device to the parent network device, or that can retransmit a data packet on behalf of the parent network device to a "failing" receiving child network device that fails to receive the data packet from the parent.

The example embodiments provide scalable spatial diversity based on the parent network device allocating each retransmit slot to a corresponding child network device within the channel distribution chunk appropriated by the parent network device; since the parent network device can appropriate (i.e., acquire or claim) the channel distribution chunk relative to neighboring network devices within an interference domain, the retransmit slots allocated by the parent network device can guarantee retransmit opportunities without introducing any interference to neighboring network devices. Further, unnecessary retransmissions are avoided, since a child network device does not retransmit a data packet unless it determines an absence of a corresponding acknowledgement during the timeslot allocated for the initial transmission of the data packet.

FIG. 1 is a diagram illustrating an example network 10 having a parent network device "N1" 12 and child network devices "N2" and "N3" 14 for retransmission of data packets, according to an example embodiment. Each network device 12, 14 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation. Hence, each apparatus 12, 14 is a network-enabled machine implementing network communications via the network 10.

The network 10 can be a stand-alone deterministic network, or can be part of a larger deterministic data network having multiple network devices (e.g., constrained "Internet of Things" (IoT) network devices) arranged in a tree-based topology, for example a RPL based network according to the Internet Engineering Task Force (IETF) Request for Comments (RFC) 6550, that can build a destination oriented directed acyclic graph (DODAG) from multiple network devices having one or more paths to a destination. As described below, each of the network devices can organize themselves into a DODAG over a channel distribution/usage (CDU) matrix 16 according to 6TiSCH. Hence, the network 10 of FIG. 1 can illustrate a subsection of a directed acyclic graph (DAG), also known as a "sub-DAG", where the parent network device "N1" 12 is a child network device of another parent network device in another sub-DAG, and each child network device 14 can be a corresponding parent network device of a corresponding sub-DAG.

Figure 2:
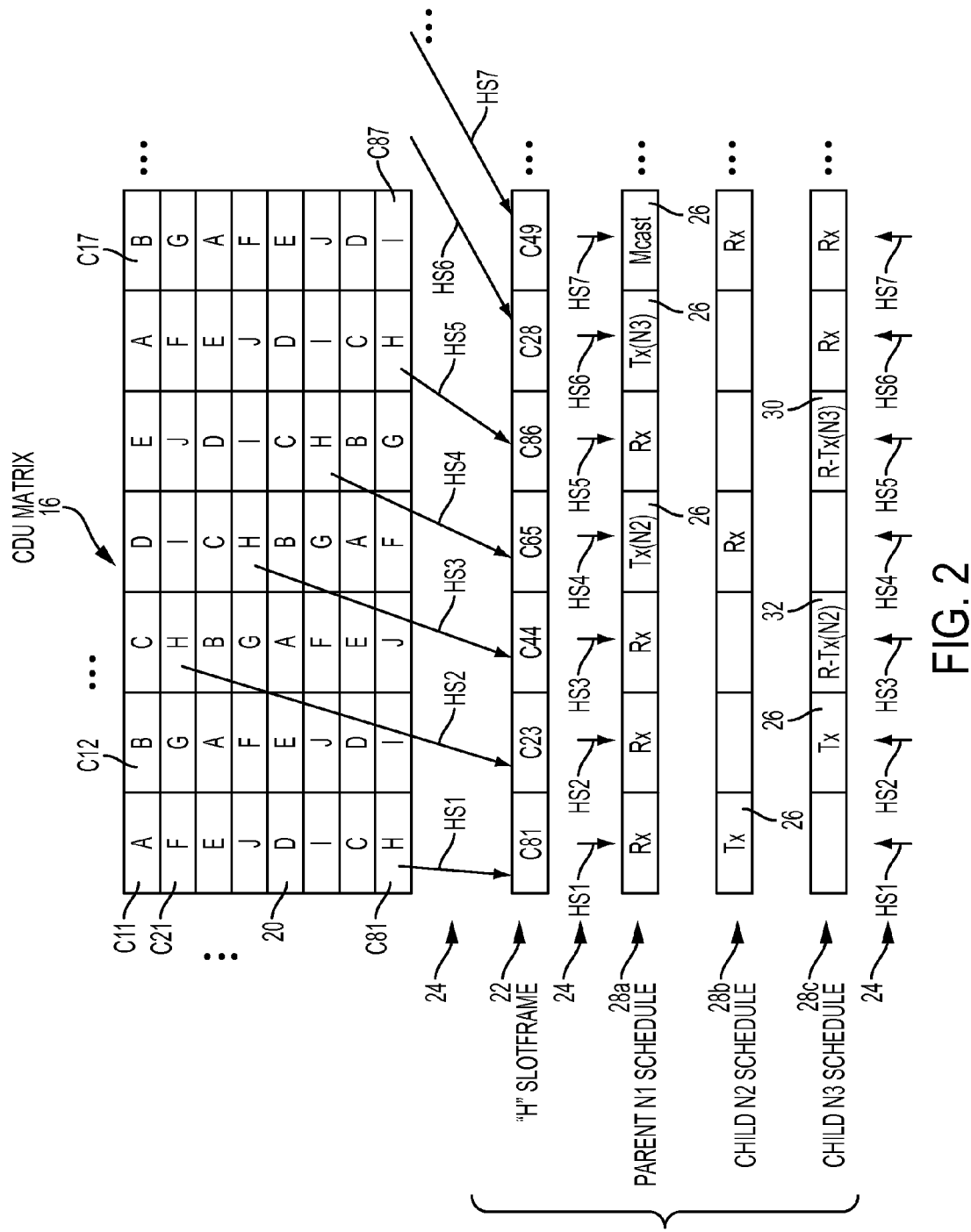
FIG. 2 is a diagram illustrating retransmit timeslots allocated to a child network device from a slotframe of a channel distribution chunk appropriated by the parent network device of FIG. 1, according to an example embodiment.

FIG. 1 also illustrates that the parent network device "N1" 12, as part of organizing a DODAG over a CDU matrix 16, can appropriate (i.e., acquire or claim) an unused one of the channel distribution chunks "H" 18 relative to neighboring network devices (not shown) within an interference domain. As illustrated in FIGS. 1 and 2, the CDU matrix 16 according to 6TiSCH can include cells (e.g., "Cij") 20, each cell "Cij" 20 representing a corresponding timeslot "j" at a corresponding channel frequency "i". Hence, each channel distribution chunk 18 is based on a prescribed sequence 22 of cells 20, referred to in FIG. 2 as a slotframe 22. As illustrated in FIGS. 1 and 2, the CDU matrix 16 can include the channel distribution chunks "A", "B", "C", "D", "E", "F", "G", "H", "I", and "J" 18. Other channel distribution chunks 18 may be present in the channel distribution chunk 18. Hence, since each channel distribution chunk 18 can provide orthogonal frequency and time diversity relative to any other channel distribution chunk 18, each parent network device in a DODAG can appropriate for itself an unused channel distribution chunk 18 relative to neighboring network devices within an interference domain (i.e., an overlapping wireless transmission area).

As illustrated in FIGS. 1 and 2, the channel distribution chunk "H" 18 appropriated by the parent network device "N1" 12 is based on the "H" slotframe 22 including the sequence of cell "C81" 20 at slot time "HS1" 24 (identifying the slot time "S1" for channel distribution chunk "H"), cell "C23" 20 at slot time "HS2" 24, cell "C44" 20 at slot time "HS3" 24, cell "C65" 20 at slot time "HS4" 24, cell "C86" 20 at slot time "HS5" 24, cell "C28" 20 at slot time "HS6" 24, cell "C49" 20 at slot time "HS7" 24, etc.

The parent network device "N1" 12 can allocate transmit timeslots 26 from the available slot times 24, resulting in a schedule 28*a* for the parent network device "N1" 12, a schedule 28*b* for the child network device "N2" 14, and a schedule 28*c* for the child network device "N3" 14, where one and only one network device 12 or 14 can transmit during any given slot time 24.

As illustrated in FIG. 2, the parent network device "N1" 12 allocates for itself within the schedule 28*a* a transmit timeslot 26 at slot time "HS4" 24 (for unicast transmission "Tx" to the child network device "N2" 14), a second transmit timeslot 26 at slot time "HS6" 24 (for unicast transmission "Tx" to the child network device "N3" 14), and a third transmit timeslot 26 at slot time "H7" 24 (for multicast transmission "Mcast" to all attached child network devices 14). The parent network device "N1" 12 also can allocate within the schedule 28*b* for the child network device "N2" 14 a transmit timeslot 26 at slot time "HS1" 24 for unicast transmission ("Tx") to the parent network device "N1" 12. The parent network device "N1" 12 also can allocate within the schedule 28*c* for the child network device "N3" 14 a transmit timeslot 26 at slot time "HS2" 24 for unicast transmission ("Tx") to the parent network device "N1" 12, and a retransmit timeslot "R-Tx(N3)" 30 that enables the child network device "N3" 14 to attempt retransmission "R-Tx" if its initial transmission ("Tx") based on the transmit timeslot 26 at slot time "HS2" 24 was unsuccessful due to a determined absence of any acknowledgement from the parent network device "N1" 12 within the slot time "HS2" 24.

The schedule 28*a* also identifies that the parent network device "N1" 12 is to receive ("Rx") a data packet at slot times "HS1", "HS2", "HS3", and "HS5". The schedule 28*b* identifies that the child network device "N2" 14 is to receive a data packet from the parent network device "N1" 12 at slot times "HS4" and "HS7". The schedule 28*c* identifies that the child network device "N3" 14 is to receive a data packet from the parent network device "N1" 12 at slot times "HS6" and "HS7" 24.

According to an example embodiment, the parent network device "N1" 12 also can allocate one or more peer retransmit timeslots 32 that enable a child network device 14 (e.g., "N3") to retransmit a data packet on behalf of another child network device 14 (e.g., "N2") to the parent network device "N1" 12 if the initial transmission by the other child network device 14 (e.g., "N2") was unsuccessful. In particular, the child network device "N3" 14 may be able to promiscuously detect transmission of a data packet by the child network device "N2" 14 at slot time "HS1" 24, for example due to better wireless transmission or reception characteristics between the child network devices "N2" and "N3" 14 than between the child network device "N2" 14 and the parent network device "N1" 12. The parent network device "N1" 12 can determine that the child network device "N3" 14 has a greater probability of successful retransmission on behalf of the child network device "N2" 14, than the child network device "N2" 14 attempting to retransmit its own data packet that failed to generate an acknowledgement at slot time "HS1" 24 (e.g., due to a retransmit capabilities message from the child network device "N3" 14, described below).

Hence, the parent network device "N1" 12 can allocate within the schedule 28*c* the peer retransmit timeslot 32 "R-Tx(N2)" at slot time "HS3" 24, enabling the child network device "N3" 14 to retransmit a data packet on behalf of the child network device "N2" 14. The parent network device "N1" 12 can unicast timeslot allocation messages 34, illustrated in FIG. 1, that specify the corresponding schedule 28*b* allocated for the child network device "N2" and the corresponding schedule 28*c* allocated for the child network device "N3". Hence, the timeslot allocation message 34 received by the child network device "N3" 14 specifies the peer retransmit timeslot 32 (at slot time "HS3" 24) that enables the child network device "N3" 14 to retransmit a data packet on behalf of the child device "N2" 14 to the parent network device "N1" 12.

As described below, the parent network device "N1" 12 also can allocate a peer retransmit timeslot 32 that enables another child network device (not shown in FIG. 1 or 2) to retransmit the data packet on behalf of the child network device "N2" 14 if the child network device "N3" is unable to successfully complete retransmission on behalf of the child network device "N2" using the peer retransmit timeslot 32 at slot time "HS3" 24. The parent network device "N1" 12 also can allocate a parent retransmit timeslot that enables the child network device (e.g., "N3") 14 to retransmit, to the peer child network device "N2" 14, a data packet on behalf of the parent network device "N1" 12. Hence, the parent network device "N1" 12 can allocate one or more peer retransmit timeslots and/or one or more parent retransmit timeslots that enable a child network device to retransmit data traffic to or from a peer child network device, enabling the child network device to add spatial diversity as an additional transmission source between the parent network device and the peer child network device.

Figure 3:
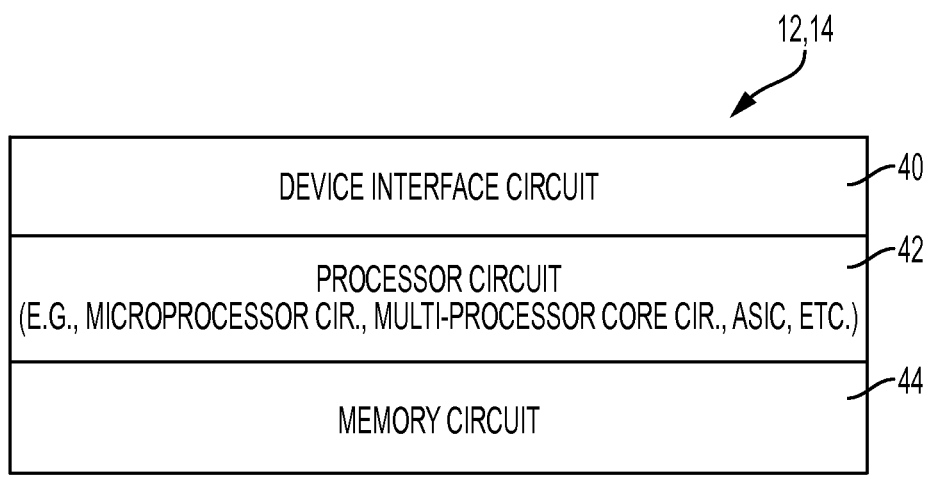
FIG. 3 illustrates an example implementation of any one of the network devices of FIG. 1, according to an example embodiment.

FIG. 3 illustrates an example implementation of any one of the network devices 12 and/or 14 of FIG. 1, according to an example embodiment. Each apparatus 12 and/or 14 can include a device interface circuit 40, a processor circuit 42, and a memory circuit 44. The device interface circuit 40 can include one or more distinct physical layer transceivers for non-deterministic wireless communications (e.g., WiFi, Wifi-Direct, etc.) with any one of the other network devices 12 and/or 14 within the channel distribution chunk 18 or any other network device within the DODAG; the device interface circuit 40 also can include an IEEE 802.15.4e transceiver for wireless deterministic network communications, for example based on sending and receiving data packets via a wireless 6TiSCH link 46 according to 6TiSCH.

The processor circuit 42 can be configured for executing any of the operations described herein, and the memory circuit 44 can be configured for storing any data or data packets as described herein, including for example a timeslot allocation message 34, any allocated schedules 28, detection reliability metrics, etc.

Any of the disclosed circuits of the network devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4:
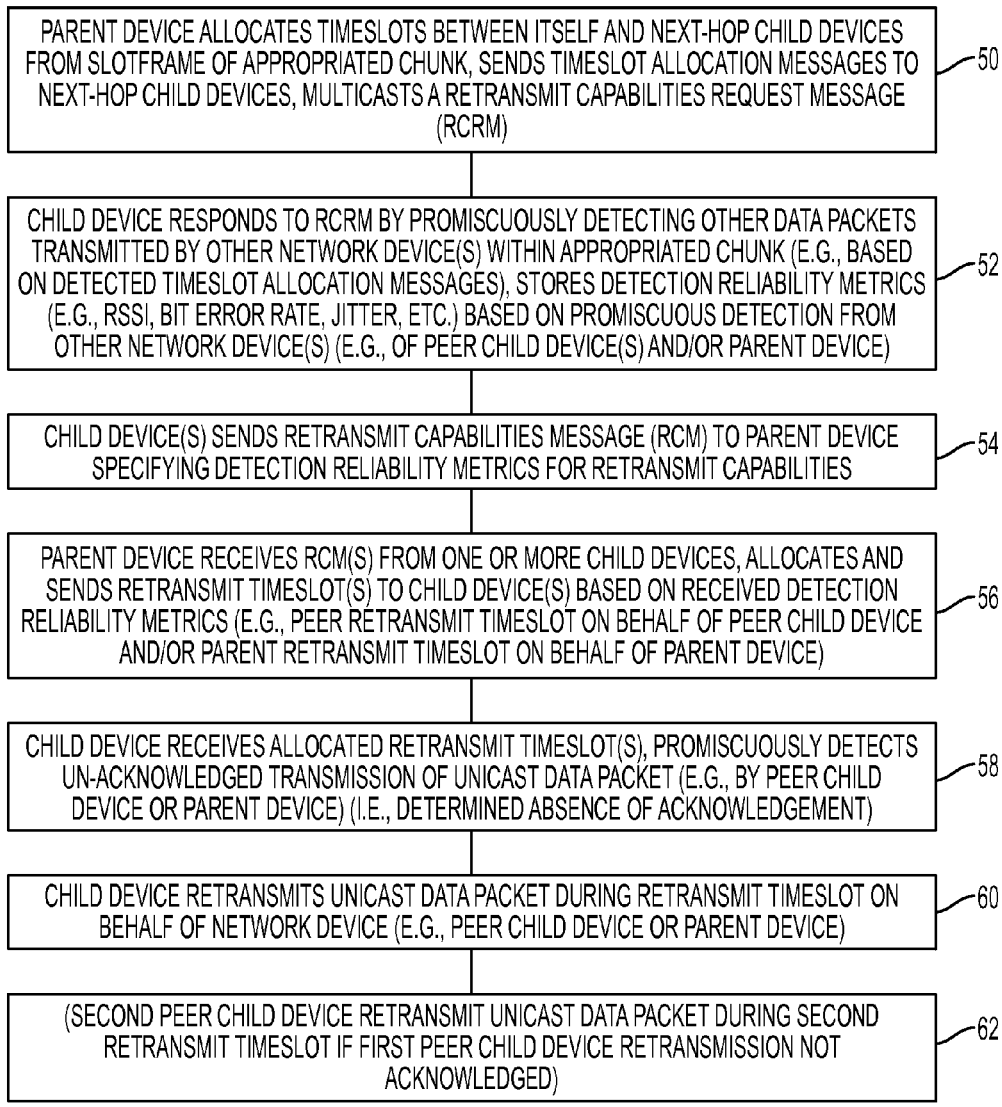
FIG. 4 illustrates an example method of allocating one or more retransmit timeslots to a child network device on behalf of another transmitting device, according to an example embodiment.

FIG. 4 illustrates an example method of allocating one or more retransmit timeslots to a child network device on behalf of another transmitting device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the processor circuit 42 of the parent network device "N1" 12 can organize with other network devices to establish a DODAG overlying the CDU matrix 16, based on the processor circuit 42 of the parent network device "N1" 12 appropriating an unused channel distribution chunk "H" 18 from the CDU matrix 16 relative to neighboring devices within a detectable interference domain (the network devices "N2" and "N3" also can appropriate, i.e., acquire or claim, their own unused channel distribution chunks 18 for their own respective subDAGs, for example "I" and "J" during formation of the DODAG). For example, the processor circuit 42 can detect an unused channel distribution chunk 18 based on receiving, from the device interface circuit 40, information or data indicating low energy levels (e.g., Received Signal Strength Indicator (RSSI), etc.) on identifiable cells 20 (identified by wireless channel frequency and slot time) that belong to identifiable channel distribution chunks 18.

The processor circuit 42 of the parent network device "N1" 12 in operation 50 can allocate one or more transmit timeslots 26 between itself and its next-hop attached child devices 14 from the slotframe 22 of the appropriated channel distribution chunk "H" 18, and create the associated schedules 28a, 28b, and 28c for the parent network device "N1" 12, the child network device "N2" 14, and the child network device "N3" 14, respectively (other schedules may be generated for other child network devices that may be attached to the parent network device "N1" 12). The processor circuit 42 of the parent network device "N1" 12 is configured for generating the timeslot allocation messages 34 and the device interface circuit 40 is configured for outputting the timeslot allocation messages 34 to the respective child network devices "N2" and "N3" 14 (assume with respect to operation 50 that the schedule 28c in the timeslot allocation message 34 sent to the child network device "N3" 14 does not yet specify the peer retransmit timeslot 32). The device interface circuit 40 of the parent network device "N1" 12 also is configured for outputting a retransmit capabilities request message (RCRM), generated by the processor circuit 42 of the parent network device "N1" 12, that requests that each child network device 14 report its retransmit capabilities to the parent network device "N1" 12.

The device interface circuit 40 of each child network device 14 is configured for receiving in operation 52 its corresponding timeslot allocation message 34 and the retransmit capabilities request message (RCRM) via the wireless 6TiSCH link 46 from the parent network device "N1" 12. The processor circuit 42 of each child network device 14 is configured for storing its corresponding schedule 28 in its memory circuit 44 for transmission of data packets to the parent network device "N1" 12 according to the corresponding allocated transmit timeslot 26.

The device interface circuit 40 and the processor circuit 42 of each child network device 14 also is configured for promiscuously detecting in operation 52 data packets transmitted by other network devices within the appropriated channel distribution chunk "H" 18, based on parsing data packets addressed to other network devices. For example, the child network device "N3" 14 can promiscuously detect the data packets transmitted between the parent network device "N1" 12 and the child network device "N2" 14 based on promiscuous detection of the timeslot allocation message 34 specifying the schedule 28b for the child network device "N2" 14. The child network device "N3" in operation 52 can store (in its memory circuit 44) detection reliability metrics for the other transmitting network devices (e.g., the parent network device "N1" 12, the child network device "N2" 14, any other child network devices, etc.). Example detection reliability metrics can include RSSI, bit error rate, jitter, etc. Hence, the detection reliability metrics can quantify the relative ability of the child network device 14 to detect a data packet transmission from an identified transmitting network device to a destination network device.

The processor circuit 42 of each child network device 14 is configured for generating in operation 54 a retransmit capabilities message (RCM) specifying the detection reliability metrics for retransmit capabilities that are stored in its memory circuit 44. The device interface circuit 40 is configured for sending in operation 54 the retransmit capabilities message to the parent network device "N1" 12, enabling the parent network device "N1" 12 to determine the retransmit capabilities of each of the child network devices 14.

The device interface circuit 40 of the parent network device "N1" 12 is configured for receiving in operation 56 the retransmit capabilities message from each of the attached child network devices 14, including the detection reliability metrics. The processor circuit 42 of the parent network device "N1" 12 is configured for associating the retransmit capabilities message to the retransmit capabilities request message 50 (e.g., for sequence tracking purposes), enabling the processor circuit 42 in operation 56 to identify from the detection reliability metrics that the child network device "N3" 14 can detect a data packet transmission to the parent network device "N1" 12 by the child network device "N2" 14, and/or that the child network device "N3" 14 can detect a data packet transmission to the child network device "N2" 14 by the parent network device "N1" 12.

In response to receiving the detection reliability metrics from the child network devices "N2" and "N3" 14, for example indicating that the child network device "N3" has better signal quality and/or reception capabilities than the child network device "N2" for data traffic between the child network device "N2" and the parent network device "N1" 12, the processor circuit 42 of the parent network device "N1" 12 is configured for allocating retransmit timeslots in operation 56 to the schedule 28c (and possibly removing retransmit timeslots from the 28b). As described previously with respect to FIG. 2, the processor circuit 42 of the parent network device "N1" 12 is configured for allocating in operation 56, within the schedule 28c, the peer retransmit timeslot 32 "R-Tx(N2)" at slot time "HS3" 24, enabling the child network device "N3" 14 to retransmit a data packet on behalf of the child network device "N2" 14.

The parent network device "N1" 12 in operation 56 can unicast an updated timeslot allocation message 34 specifying the transmit timeslot 26 including the peer retransmit timeslot 32, illustrated in FIG. 1, that specifies the schedule 28c allocated for the child network device "N3"; alternately, the parent network device "N1" 12 can unicast to the child network device "N3" a special allocation message that specifies only the peer retransmit timeslot 32 and/or the parent retransmit timeslot. Although not illustrated in FIGS. 1 and 2, the processor circuit 42 of the parent network device "N1" 12 also can allocate in operation 56 a parent retransmit timeslot on behalf of the parent network device "N1" 12 in the schedule 28c, enabling the child network device 14 to retransmit a data packet on behalf of the parent network device "N1" 12 to the child network device "N2" 14.

If the child network device "N2" was previously allocated a retransmit timeslot 30, the device interface circuit 40 of the parent network device "N1" 12 can output an updated timeslot allocation message 34 specifying the schedule 28b with no retransmit timeslot 30 allocated to the child network device "N2" 14.

The device interface circuit 40 of the child network device "N3" 14 is configured for receiving in operation 58 the peer retransmit timeslot 32 and/or the parent retransmit timeslot (e.g., in an updated timeslot allocation message 34 or a special allocation message), causing the processor circuit 42 in operation 58 to update the schedule 28c stored in the memory circuit 44. Hence, the timeslot allocation message 34 and/or special allocation message received by the child network device "N3" 14 specifies the peer retransmit timeslot 32 (at slot time "HS3" 24) that enables the child network device "N3" 14 to retransmit a data packet on behalf of the child network device "N2" 14 to the parent network device "N1" 12. Any received parent retransmit timeslot also enables the child network device "N3" 14 to retransmit a data packet on behalf of the parent network device "N1" to the child network device "N2" 14.

The processor circuit 42 of the child network device "N3" 14 is configured for promiscuously detecting in operation 58 any un-acknowledged transmission of data packets, either by the peer child network device "N2" and/or the parent network device "N1", based on determining whether a corresponding acknowledgement is detected within the corresponding transmit timeslot 26. For example, the processor circuit 42 of the child network device "N3" is configured in operation 58 for detecting a determined absence of an acknowledgement by the parent network device "N1" 12 to a newly-transmitted data packet from the child network device "N2" at timeslot "HS1" 24. In response to the determined absence of an acknowledgement at slot time "HS1" 24, the processor circuit 42 of the child network device "N3" 14 in operation 60 is configured for causing unicast retransmission of the newly-transmitted data packet using the peer retransmit timeslot "R-Tx(N2)" 32 at slot time "HS3" 24, on behalf of the child network device "N2" 14 to the parent network device "N1" 12.

The child network device "N3" 42 also can cause retransmission of a data packet on behalf of the parent network device "N1" 12. For example, assume the parent network device "N1" allocates a parent retransmit timeslot "R-Tx (N1)" at a slot time "HS8" 24 (not shown in FIG. 2). The processor circuit 42 of the child network device "N3" is configured in operation 58 for detecting a determined absence of an acknowledgement by the child network device "N2" 14 to a second transmitted data packet from the parent network device "N1" 12 at timeslot "HS4" 24. In response to the determined absence of an acknowledgement at slot time "HS4" 24, the processor circuit 42 of the child network device "N3" 14 in operation 60 is configured for causing unicast retransmission of the second transmitted data packet using the parent retransmit timeslot "R-Tx(N1)" at slot time "HS8" 24, on behalf of the parent network device "N1" 12 to the child network device "N2" 14.

Assuming another child network device (e.g. "N4" not shown in FIG. 1) is attached to the parent network device "N1" 12 and has transmitted a corresponding retransmit capabilities message to the parent network device "N1" 12, the parent network device "N1" 12 also can allocate a peer retransmit timeslot 32 (e.g., at slot time "HS9" 24) that enables the child network device "N4" in operation 62 to retransmit the data packet on behalf of the child network device "N2" 14 if the child network device "N3" is unable to successfully complete retransmission on behalf of the child network device "N2" using the peer retransmit timeslot 32 at slot time "HS3" 24. Hence, the parent network device "N1" 12 can allocate one or more peer retransmit timeslots and/or one or more parent retransmit timeslots that enable multiple child network devices to attempt multiple attempts to retransmit data traffic to or from a peer child network device, enhancing spatial diversity based on adding transmission sources for retransmission attempts.

According to example embodiments, reliability (e.g., successful reception of data traffic) can be enhanced in a wireless deterministic network in a scalable manner, without introducing any interference or degradation in network performance. Retransmission attempts can be directed to child network devices demonstrating the highest probability of successful transmission, while minimizing retransmission attempts by other child network devices having poor transmission or reception capabilities with their parent network device.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
appropriating, by a parent network device in a destination oriented directed acyclic graph (DODAG) in a wireless deterministic network, a channel distribution chunk as a subset of available cells from a channel distribution/usage (CDU) matrix, each cell representing a corresponding wireless frequency channel at a corresponding timeslot, the channel distribution chunk enabling the parent network device to establish a sub-directed acyclic graph, within the DODAG, for communications within the sub-directed acyclic graph without introducing interference to other network devices outside of the sub-directed acyclic graph and within an overlapping wireless transmission area in the DODAG;
receiving, by the parent network device, a retransmit capabilities message from a first child device attached to the parent network device and within the sub-directed acyclic graph, the retransmit capabilities message indicating relative ability of the first child device to detect a data packet transmission to the parent network device by a second child device within the sub-directed acyclic graph based on stored network reliability metrics for the second child device, the second child device attached to the parent network device and the second child device a peer of the first child device; and
allocating in response to receiving the retransmit capabilities message, by the parent network device, a peer retransmit timeslot to the first child device from within the channel distribution chunk appropriated by the parent network device, the peer retransmit timeslot enabling the first child device to respond to a failed transmission of a data packet, by the second child device to the parent network device following the data packet transmission, by retransmitting the data packet on behalf of the second child device to the parent network device.

2. The method of claim 1, further comprising:
receiving, by the parent network device, a second retransmit capabilities message from a third child device attached to the parent network device, the second retransmit capabilities message specifying that the third child device can detect the data packet transmission by the second child device; and
allocating, by the parent network device, a second peer retransmit timeslot to the third child device from within the channel distribution chunk, the second peer retransmit timeslot enabling the third child device to retransmit the data packet on behalf of the second child device to the parent network device if the first child device cannot retransmit the data packet.

3. The method of claim 1, wherein the allocating further comprises allocating, to the first child device from within the channel distribution chunk, a parent retransmit timeslot that enables the first child device to retransmit, to the second child device, a data packet on behalf of the parent network device.

4. The method of claim 1, further comprising the parent network device multicasting a retransmit capabilities request message, the allocating based on associating the retransmit capabilities message to the retransmit capabilities request message.

5. An apparatus comprising:
a processor circuit configured for appropriating, as a parent network device in a destination oriented directed acyclic graph (DODAG) in a wireless deterministic network, a channel distribution chunk as a subset of available cells from a channel distribution/usage (CDU) matrix, each cell representing a corresponding wireless frequency channel at a corresponding timeslot, the channel distribution chunk enabling the parent network device to establish a sub-directed acyclic graph, within the DODAG, for communications within the sub-directed acyclic graph without introducing interference to other network devices outside of the sub-directed acyclic graph and within an overlapping wireless transmission area in the DODAG; and
a device interface circuit configured for receiving a retransmit capabilities message from a first child device attached to the apparatus and within the sub-directed acyclic graph, the retransmit capabilities message indicating relative ability of the first child device to detect a data packet transmission to the apparatus by a second child device within the sub-directed acyclic graph based on stored network reliability metrics for the second child device, the second child device attached to the apparatus and the second child device a peer of the first child device;
the processor circuit further configured for allocating, in response to receiving the retransmit capabilities message, a peer retransmit timeslot to the first child device from within the channel distribution chunk appropriated by the apparatus, the peer retransmit timeslot enabling the first child device to respond to a failed transmission of a data packet, by the second child device to the parent network device following the data packet transmission, by retransmitting the data packet on behalf of the second child device to the apparatus.

6. The apparatus of claim 5, wherein:
the device interface circuit is further configured for receiving a second retransmit capabilities message from a third child device attached to the apparatus, the second retransmit capabilities message specifying that the third child device can detect the data packet transmission by the second child device;
the processor circuit further configured for allocating a second peer retransmit timeslot to the third child device from within the channel distribution chunk, the second peer retransmit timeslot enabling the third child device to retransmit the data packet on behalf of the second child device to the parent network device if the first child device cannot retransmit the data packet.

7. The apparatus of claim 5, wherein the processor circuit further is configured for allocating, to the first child device from within the channel distribution chunk, a parent retransmit timeslot that enables the first child device to retransmit, to the second child device, a data packet on behalf of the parent network device.

8. The apparatus of claim 5, wherein the device interface circuit is configured for multicasting a retransmit capabilities request message, the processor circuit configured for allocating the peer retransmit timeslot based on associating the retransmit capabilities message to the retransmit capabilities request message.

9. One or more non-transitory tangible media encoded with logic for execution by a machine and when executed by the machine operable for:
appropriating, by a parent network device in a destination oriented directed acyclic graph (DODAG) in a wireless deterministic network, a channel distribution chunk as a subset of available cells from a channel distribution/usage (CDU) matrix, each cell representing a corresponding wireless frequency channel at a corresponding timeslot, the channel distribution chunk enabling the parent network device to establish a sub-directed acyclic graph, within the DODAG, for communications within the sub-directed acyclic graph without introducing interference to other network devices outside of the sub-directed acyclic graph and within an overlapping wireless transmission area in the DODAG;
receiving, by the parent network device, a retransmit capabilities message from a first child device attached to the parent network device and within the sub-directed acyclic graph, the retransmit capabilities message indicating relative ability of the first child device to detect a data packet transmission to the parent network device by a second child device within the sub-directed acyclic graph based on stored network reliability metrics for the second child device, the second child device attached to the parent network device and the second child device a peer of the first child device; and
allocating in response to receiving the retransmit capabilities message, by the parent network device, a peer retransmit timeslot to the first child device from within the channel distribution chunk appropriated by the parent network device, the peer retransmit timeslot enabling the first child device to respond to a failed transmission of a data packet, by the second child device to the parent network device following the data packet transmission, by retransmitting the data packet on behalf of the second child device to the parent network device.

10. A method comprising:
sending, by a child network device attached to a parent network device in a wireless deterministic network, a retransmit capabilities message to the parent network device, the retransmit capabilities message indicating relative ability of the child network device to detect a data packet transmission to the parent network device by a second child device based on stored network reliability metrics for the second child device, the second child device attached to the parent network device and a peer of the child network device, the child network device and the second child device attached to the parent network device within a sub-directed acyclic graph established by the parent network device and that is within a destination oriented directed acyclic graph (DODAG) based on the parent network device having appropriated a channel distribution chunk as a subset of available cells from a channel distribution/usage (CDU) matrix, each cell representing a corresponding wireless frequency channel at a corresponding timeslot, the channel distribution chunk enabling communications within the sub-directed acyclic graph without introducing interference to other network devices outside of the sub-directed acyclic graph and within an overlapping wireless transmission area in the DODAG; and
receiving, by the child network device from the parent network device, a peer retransmit timeslot allocated to the child network device in response to the parent network device receiving the retransmit capabilities message, the peer retransmit timeslot allocated by the parent network device from within the channel distribution chunk appropriated by the parent network device, the peer retransmit timeslot enabling the child network device to respond to a failed transmission of a data packet, by the second child device to the parent network device following the data packet transmission, by retransmitting the data packet on behalf of the second child device to the parent network device.

11. The method of claim 10, further comprising:
detecting, by the child network device, a determined absence of an acknowledgement by the parent network device to a newly-transmitted data packet from the second child device; and
the child network device retransmitting the newly-transmitted data packet using the peer retransmit timeslot, on behalf of the second child device to the parent network device, in response to the determined absence of the acknowledgement.

12. The method of claim 10, further comprising:
receiving, by the child network device, a parent retransmit timeslot that enables the child network device to retransmit, to the second child device, a data packet on behalf of the parent network device;
detecting, by the child network device, a determined absence of an acknowledgement by the second child device to a second transmitted data packet from the parent network device; and
the child network device retransmitting the second transmitted data packet using the parent retransmit timeslot, on behalf of the parent network device to the second child device, in response to the determined absence of the acknowledgement.

13. The method of claim 10, further comprising:
receiving, by the child network device, a retransmit capabilities request message from the parent network device;

determining, by the child network device, detectability of the data packet transmission to the parent network device by the second child device based on promiscuous detection of the data packet transmission on timeslots allocated to the second child device within the channel distribution chunk; and generating the retransmit capabilities message, responsive to the retransmit capabilities request message, based on the promiscuous detection of the data packet transmission.

14. The method of claim 13, wherein the generating includes specifying, within the retransmit capabilities message, detection reliability metrics based on the promiscuous detection of the data packet transmission.

15. An apparatus comprising:

a processor circuit configured for generating a retransmit capabilities message for a parent network device in a wireless deterministic network, the apparatus attached as a child network device to the parent network device, the retransmit capabilities message indicating relative ability of the apparatus to detect a data packet transmission to the parent network device by a second child device based on stored network reliability metrics for the second child device, the second child device attached to the parent network device and a peer of the apparatus, the child network device and the second child device attached to the parent network device within a sub-directed acyclic graph established by the parent network device and that is within a destination oriented directed acyclic graph (DODAG) based on the parent network device having appropriated a channel distribution chunk as a subset of available cells from a channel distribution/usage (CDU) matrix, each cell representing a corresponding wireless frequency channel at a corresponding timeslot, the channel distribution chunk enabling communications within the sub-directed acyclic graph without introducing interference to other network devices outside of the sub-directed acyclic graph and within an overlapping wireless transmission area in the DODAG; and a device interface circuit configured for sending the retransmit capabilities message to the parent network device, the device interface circuit further configured for receiving, from the parent network device, a peer retransmit timeslot allocated to the apparatus in response to the parent network device receiving the retransmit capabilities message, the peer retransmit timeslot allocated by the parent network device from within the channel distribution chunk appropriated by the parent network device, the peer retransmit timeslot enabling the apparatus to respond to a failed transmission of a data packet, by the second child device to the parent network device following the data packet transmission, by retransmitting the data packet on behalf of the second child device to the parent network device.

16. The apparatus of claim 15, wherein:

the processor circuit is configured for detecting a determined absence of an acknowledgement by the parent network device to a newly-transmitted data packet from the second child device;

the processor circuit configured for causing retransmission of the newly-transmitted data packet using the peer retransmit timeslot, on behalf of the second child device to the parent network device, in response to the determined absence of the acknowledgement.

17. The apparatus of claim 15, wherein:

the device interface circuit is configured for receiving a parent retransmit timeslot that enables the apparatus to retransmit, to the second child device, a data packet on behalf of the parent network device;

the processor circuit configured for detecting a determined absence of an acknowledgement by the second child device to a second transmitted data packet from the parent network device;

the processor circuit further configured for causing retransmission of the second transmitted data packet using the parent retransmit timeslot, on behalf of the parent network device to the second child device, in response to the determined absence of the acknowledgement.

18. The apparatus of claim 15, wherein:

the device interface circuit is configured for receiving a retransmit capabilities request message from the parent network device;

the processor circuit is configured for determining detectability of the data packet transmission to the parent network device by the second child device based on promiscuous detection of the data packet transmission on timeslots allocated to the second child device within the channel distribution chunk; and the processor circuit is configured for generating the retransmit capabilities message, responsive to the retransmit capabilities request message, based on the promiscuous detection of the data packet transmission.

19. The apparatus of claim 18, wherein the processor circuit is configured for specifying, within the retransmit capabilities message, detection reliability metrics based on the promiscuous detection of the data packet transmission.

20. One or more non-transitory tangible media encoded with logic for execution by a machine and when executed by the machine operable for:

sending, by a child network device attached to a parent network device in a wireless deterministic network, a retransmit capabilities message to the parent network device, the retransmit capabilities message indicating relative ability of the child network device to detect a data packet transmission to the parent network device by a second child device based on stored network reliability metrics for the second child device, the second child device attached to the parent network device and a peer of the child network device, the child network device and the second child device attached to the parent network device within a sub-directed acyclic graph established by the parent network device and that is within a destination oriented directed acyclic graph (DODAG) based on the parent network device having appropriated a channel distribution chunk as a subset of available cells from a channel distribution/usage (CDU) matrix, each cell representing a corresponding wireless frequency channel at a corresponding timeslot, the channel distribution chunk enabling communications within the sub-directed acyclic graph without introducing interference to other network devices outside of the sub-directed acyclic graph and within an overlapping wireless transmission area in the DODAG; and receiving, by the child network device from the parent network device, a peer retransmit timeslot allocated to the child network device in response to the parent network device receiving the retransmit capabilities message, the peer retransmit timeslot allocated by the parent network device from within the channel distribution chunk appropriated by the parent network device, the peer retransmit timeslot enabling the child network device to respond to a failed transmission of a data packet, by the second child device to the parent network device following the data packet transmission, by retransmitting the data packet on behalf of the second child device to the parent network device.

* * * * *